US010068717B2

United States Patent
Kinpara et al.

(10) Patent No.: US 10,068,717 B2
(45) Date of Patent: Sep. 4, 2018

(54) BINDER FOR ELECTRIC DOUBLE-LAYER CAPACITOR ELECTRODE, ELECTRIC DOUBLE-LAYER CAPACITOR ELECTRODE COMPRISING SAME BINDER, ELECTRIC DOUBLE-LAYER CAPACITOR USING SAME ELECTRODE, AND ELECTRIC APPARATUS

(71) Applicants: Sumitomo Seika Chemicals Co., Ltd., Hyogo (JP); National Institute of Advanced Industrial Science and Technology, Tokyo (JP)

(72) Inventors: Yuji Kinpara, Hyogo (JP); Junichi Fujishige, Hyogo (JP); Nobutaka Fujimoto, Osaka (JP); Shuichi Karashima, Osaka (JP); Takashi Mukai, Osaka (JP); Tetsuo Sakai, Osaka (JP)

(73) Assignees: Sumitomo Seika Chemicals Co., Ltd., Hyogo (JP); National Institute of Advanced Industrial Science and Technology, Tokyo (JP)

( * ) Notice: Subject to any disclaimer, the term of this patent is extended or adjusted under 35 U.S.C. 154(b) by 0 days.

(21) Appl. No.: 15/300,921

(22) PCT Filed: Mar. 19, 2015

(86) PCT No.: PCT/JP2015/001544
§ 371 (c)(1),
(2) Date: Sep. 30, 2016

(87) PCT Pub. No.: WO2015/151440
PCT Pub. Date: Oct. 8, 2015

(65) Prior Publication Data
US 2017/0025230 A1    Jan. 26, 2017

(30) Foreign Application Priority Data

Apr. 1, 2014 (JP) ................. 2014-075603

(51) Int. Cl.
   *H01G 11/38* (2013.01)
   *H01G 11/30* (2013.01)
   *C08F 261/04* (2006.01)
   *C08F 218/08* (2006.01)
   *C08F 220/06* (2006.01)
   *C08F 220/14* (2006.01)
   *C09D 133/02* (2006.01)
   *H01M 4/62* (2006.01)

(52) U.S. Cl.
   CPC .......... *H01G 11/38* (2013.01); *C08F 218/08* (2013.01); *C08F 220/06* (2013.01); *C08F 220/14* (2013.01); *C08F 261/04* (2013.01); *H01G 11/30* (2013.01); *C09D 133/02* (2013.01); *H01M 4/622* (2013.01); *Y02E 60/13* (2013.01); *Y02T 10/7022* (2013.01)

(58) Field of Classification Search
   CPC ..... C08F 261/04; C09D 133/02; H01G 11/30; H01G 11/38; H01M 4/622; Y02E 60/13; Y02T 10/7022
   See application file for complete search history.

(56) References Cited

U.S. PATENT DOCUMENTS

| 4,102,842 | A | * | 7/1978 | Fujimoto | ................. | C08F 6/10 |
| | | | | | | 524/555 |
| 4,392,908 | A | * | 7/1983 | Dehnel | ............. | A61F 13/00991 |
| | | | | | | 156/283 |
| 5,445,669 | A | * | 8/1995 | Nakabayashi | ....... | B01D 53/228 |
| | | | | | | 423/226 |
| 5,525,444 | A | * | 6/1996 | Ito | ......................... | H01M 4/621 |
| | | | | | | 429/206 |
| 6,573,004 | B1 | | 6/2003 | Igarashi et al. | | |
| 2002/0080558 | A1 | * | 6/2002 | Nonaka | ..................... | H01G 9/04 |
| | | | | | | 361/502 |
| 2008/0149887 | A1 | * | 6/2008 | Wang | ..................... | C08F 214/20 |
| | | | | | | 252/182.1 |
| 2012/0070737 | A1 | | 3/2012 | Son et al. | | |
| 2013/0330621 | A1 | * | 12/2013 | Narumi | ............... | C08F 214/265 |
| | | | | | | 429/217 |
| 2015/0280237 | A1 | | 10/2015 | Mukai et al. | | |

FOREIGN PATENT DOCUMENTS

| EP | 0 638 353 A1 | 2/1995 | | |
| EP | 2 690 688 A1 | 1/2014 | | |
| JP | 8-55761 A | 2/1996 | | |
| JP | 8-339808 A | 12/1996 | | |
| JP | 10-64517 A | 3/1998 | | |
| JP | 11-250915 A | 9/1999 | | |
| JP | 2002-151085 A | 5/2002 | | |
| JP | 2005-85557 A | 3/2005 | | |
| JP | 2005-136401 A | 5/2005 | | |
| JP | 2008-198936 A | 8/2008 | | |
| JP | 2009-88271 A | 4/2009 | | |
| JP | 2012-64574 A | 3/2012 | | |
| JP | 2012-212621 A | 11/2012 | | |
| WO | WO-2012111770 A1 | * | 8/2012 | .......... C08F 214/265 |
| WO | WO 2014/057627 A1 | 4/2014 | | |

OTHER PUBLICATIONS

Extended European Search Report from European Patent Application No. 15773428.6, dated Nov. 29, 2017, 7 pages.

* cited by examiner

*Primary Examiner* — Mark S Kaucher
(74) *Attorney, Agent, or Firm* — Alston & Bird LLP

(57) ABSTRACT

A binder for an electric double-layer capacitor electrode according to the present invention includes a copolymer of vinyl alcohol and an alkali metal-neutralized product of ethylene-unsaturated carboxylic acid.

3 Claims, No Drawings

BINDER FOR ELECTRIC DOUBLE-LAYER CAPACITOR ELECTRODE, ELECTRIC DOUBLE-LAYER CAPACITOR ELECTRODE COMPRISING SAME BINDER, ELECTRIC DOUBLE-LAYER CAPACITOR USING SAME ELECTRODE, AND ELECTRIC APPARATUS

This application is a national phase entry of International Application No. PCT/JP2015/001544, filed Mar. 19, 2015, which claims priority to Japanese Application No. 2014-075603, filed Apr. 1, 2014, the entire contents of each of which are incorporated herein by reference.

TECHNICAL FIELD

The present invention relates to a binder for an electric double-layer capacitor electrode, an electric double-layer capacitor electrode including this binder, an electric double-layer capacitor using this electrode, and an electric device.

BACKGROUND ART

Capacitors have been used in an increasingly wide range of applications as electrical storage devices having large capacity, good charge/discharge cycle characteristics, and reduced self-discharge. Examples of those applications include power sources for vehicles such as electric cars and electric two wheelers, and backup power sources for electronic devices. Such electrical storage devices used as the power sources for vehicles are required not only to have a high energy density but also to operate in a wide temperature range.

A capacitor electrode is obtained by coating a current collector with an electrode mixture containing an active material, a binder, and a conductive assistant, and drying the coating.

For example, the electrode may be obtained by coating aluminum foil or a stainless-steel current collector with electrode mixture slurry prepared by dispersing, in a dispersion medium, activated carbon as an active material, polyvinylidene fluoride (PVdF) as a binder, and carbon black as a conductive assistant, and drying the coating (see Patent Documents 1 and 2).

To increase the capacity, a lithium ion capacitor, which is an asymmetric capacitor having a positive electrode integrating the principle of an electric double-layer capacitor and a negative electrode integrating the principle of a lithium ion secondary battery, has been widely studied in recent years.

For a capacitor, may be used an organic solvent such as propylene carbonate, a nonaqueous electrolytic solution dissolving aliphatic ammonium salt as an electrolyte, and an electrolytic solution such as an aqueous solution of sulfuric acid containing a supporting electrolyte.

A binder for an electrode has been required to have a binding capacity, resistance to an electrolytic solution, resistance to temperature, electrochemical stability, low resistance, and other properties. In particular, improvement has been required in terms of a binding capacity which influences the cycle characteristics of the capacitor, low resistance associated with capacitance, and heat resistance which allows the capacitor to operate in harsh environments.

However, if a fluorine-based resin which has been used as a common binder, such as PVdF, is selected, the resin needs to be used in profusion to compensate for its low binding capacity and flexibility. As a result, the amount of an active material decreases. In addition, discharge characteristics of the capacitor will deteriorate due to an increase in resistance, and a lifetime of the electrode will be shortened.

In contrast, a method of using a styrene-butadiene copolymer (SBR) or an acrylic emulsion as a binder to improve the binding capacity has also been proposed. However, use of only such binders may result in low viscosity, and uniform electrode mixture slurry cannot be obtained. Therefore, a dispersion such as carboxymethyl cellulose (CMC) and hydroxypropyl cellulose need to be used as well (see Patent Documents 3, 4, and 5). Further, the resistance of the electrode may increase disadvantageously because the styrene-butadiene copolymer and the acrylic emulsion are insulating rubber-like materials.

CITATION LIST

Patent Documents

Patent Document 1: Japanese Unexamined Patent Publication No. H08-055761

Patent Document 2: Japanese Unexamined Patent Publication No. H10-064517

Patent Document 3: Japanese Unexamined Patent Publication No. 2005-136401

Patent Document 4: Japanese Unexamined Patent Publication No. 2008-198936

Patent Document 5: Japanese Unexamined Patent Publication No. 2009-088271

Patent Document 6: Japanese Unexamined Patent Publication No. 2012-064574

SUMMARY

In view of the current state of the related art described above, it is therefore an object of the present invention to provide a binder, having a high binding capacity and binding persistence and substantially preventing the resistance from increasing, for an electric double-layer capacitor electrode, and also provide an electric double-layer capacitor electrode including such a binder, an electric double-layer capacitor using this electrode, and an electric device.

The present inventors conducted intensive studies to solve the above-described problems. As a result, we discovered that use of a copolymer of vinyl alcohol and an alkali metal-neutralized product of ethylene-unsaturated carboxylic acid as a binder for an electric double-layer capacitor electrode makes it possible to reduce the chances of separation of an electrode mixture from a current collector and elimination of an active material, and to obtain a capacitor with a significantly longer lifetime. In this manner, we perfected our invention.

A binder for an electric double-layer capacitor electrode according to the present invention includes a copolymer of vinyl alcohol and an alkali metal-neutralized product of ethylene-unsaturated carboxylic acid.

The binder may include 20% by mass or more of the copolymer of the vinyl alcohol and the alkali metal-neutralized product of ethylene-unsaturated carboxylic acid.

The copolymer suitably has a molar ratio of the vinyl alcohol to the alkali metal-neutralized product of ethylene-unsaturated carboxylic acid of 9/1-1/9.

The alkali metal-neutralized product of ethylene-unsaturated carboxylic acid is suitably an alkali metal-neutralized product of acrylic acid or an alkali metal-neutralized product of methacrylic acid.

The copolymer of the vinyl alcohol and the alkali metal-neutralized product of ethylene-unsaturated carboxylic acid suitably has a volume average particle size of 1 μm to 200 μm.

An aqueous solution containing 1% by mass of the copolymer of the vinyl alcohol and the alkali metal-neutralized product of ethylene-unsaturated carboxylic acid suitably has a viscosity of 50 mPa·s to 10000 mPa·s.

An electric double-layer capacitor electrode according to the present invention includes: an active material; a conductive assistant; and any one of the above-described binders.

In the electric double-layer capacitor electrode according to the present invention, the content of the binder is suitably 0.5% by mass to 30% by mass relative to the total mass of the active material, the conductive assistant, and the binder.

An electric double-layer capacitor according to the present invention includes the electric double-layer capacitor electrode.

An electric device according to the present invention includes the electric double-layer capacitor.

According to the present invention, a particular binder is used. This may provide an electric double-layer capacitor electrode and electric double-layer capacitor having good stability. Thus, the electric double-layer capacitor according to the present invention may have a significantly longer lifetime than conventional electric double-layer capacitors, and may achieve both of enhanced cell functions and cost reduction. This makes the electric double-layer capacitor applicable in a wider range.

DESCRIPTION OF EMBODIMENTS

A binder for an electric double-layer capacitor electrode according to the present invention, an electric double-layer capacitor electrode and electric double-layer capacitor including this binder, and an electric device including the electric double-layer capacitor will be described below.

<Binder for Electric Double-Layer Capacitor Electrode>

A binder for an electric double-layer capacitor electrode according to the present invention includes a copolymer of vinyl alcohol and an alkali metal-neutralized product of ethylene-unsaturated carboxylic acid.

The copolymer of the vinyl alcohol and the alkali metal-neutralized product of ethylene-unsaturated carboxylic acid is a copolymer including the vinyl alcohol and the alkali metal-neutralized product of ethylene-unsaturated carboxylic acid as a constitutional repeating unit. The copolymer of the vinyl alcohol and the alkali metal-neutralized product of ethylene-unsaturated carboxylic acid may be obtained by, for example, saponifying a copolymer obtained through copolymerization of vinyl ester and ethylene-unsaturated carboxylic acid ester in a solvent mixture of an aqueous organic solvent and water in the presence of an alkali including an alkali metal. Specifically, vinyl alcohol itself is unstable and cannot be used as a monomer as it is. However, if a polymer obtained by using vinyl ester as a monomer is saponified, the polymer thus produced ends up as a polymer obtained through polymerization of vinyl alcohol as a monomer.

Examples of vinyl ester may include vinyl acetate, vinyl propionate, and vinyl pivalate. Among them, vinyl acetate is suitably used for easy progression of saponification. These vinyl esters may be used alone, or two or more of them may be used in combination.

Examples of ethylene-unsaturated carboxylic acid ester may include methyl ester, ethyl ester, n-propyl ester, iso-propyl ester, n-butyl ester, or t-butyl ester of acrylic acid or methacrylic acid. Among them, methyl acrylate or methyl methacrylate is suitably used for easy progression of saponification. Any one of these ethylene-unsaturated carboxylic acid esters may be used alone, or two or more of them may be used in combination.

If necessary, any other ethylene-unsaturated monomer copolymerizable with vinyl ester and ethylene-unsaturated carboxylic acid ester, or a crosslinker may also be copolymerized.

Saponification in which a vinyl acetate/methyl acrylate copolymer is perfectly saponified with potassium hydroxide (KOH) is shown below as an example of saponification in this embodiment.

[Chemical Formula 1]

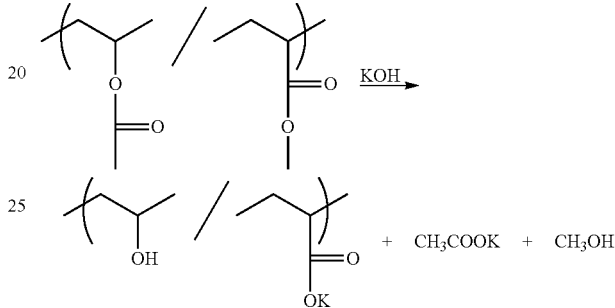

As described above, the copolymer of the vinyl alcohol and the alkali metal-neutralized product of ethylene-unsaturated carboxylic acid according to this embodiment is a substance obtained by randomly copolymerizing vinyl ester and ethylene-unsaturated carboxylic acid ester, and saponifying an ester portion derived from the associated monomer. The bond between the monomers is a C—C covalent bond (hereinafter sometimes referred to as a "saponified product of a vinyl ester/ethylene-unsaturated carboxylic acid ester copolymer").

On the other hand, Patent Document 6 discloses a crosslinked compound of polyacrylic acid substituted with alkali cations and polyvinyl alcohol. This crosslinked compound has a structure in which polyacrylic acid and polyvinyl alcohol are crosslinked by an ester bond. Thus, the crosslinked compound of polyacrylic acid substituted with alkali cations and polyvinyl alcohol disclosed in Patent Document 6 is a substance quite different from the copolymer of the vinyl alcohol and the alkali metal-neutralized product of ethylene-unsaturated carboxylic acid according to this embodiment.

In the copolymer of vinyl ester and ethylene-unsaturated carboxylic acid ester according to this embodiment, the molar ratio of vinyl ester to ethylene-unsaturated carboxylic acid ester is suitably 9/1-1/9, more suitably 8/2-2/8. A molar ratio falling out of the range of 9/1-1/9 is not advantageous in some cases because a polymer obtained after saponification may tend to be deficient in binding capacity required for a binder.

Thus, in the copolymer of the vinyl alcohol and the alkali metal-neutralized product of ethylene-unsaturated carboxylic acid thus obtained, the copolymer composition ratio is suitably 9/1-1/9, more suitably 8/2-2/8, in terms of the molar ratio. In the examples to be described later, the copolymer composition ratio will be in the range of 8/2-4/6.

The alkali metal-neutralized product of ethylene-unsaturated carboxylic acid is suitably an alkali metal-neutralized product of acrylic acid or an alkali metal-neutralized product of methacrylic acid for its high binding property. Sodium acrylate or sodium methacrylate is more suitably used.

To obtain a copolymer in the form of powder, a vinyl ester/ethylene-unsaturated carboxylic acid ester copolymer, which is a precursor of the copolymer of vinyl alcohol and the alkali metal-neutralized product of ethylene-unsaturated carboxylic acid, is suitably obtained by suspension polymerization in which a monomer including vinyl ester as a main component and a monomer including ethylene-unsaturated carboxylic acid ester as a main component are polymerized into polymer particles while being suspended in an aqueous solution containing a polymerization catalyst and a dispersant dissolved.

Examples of the polymerization catalyst may include organic peroxides such as benzoyl peroxide and lauryl peroxide, and azo compounds such as azobisisobutyronitrile and azobisdimethylvaleronitrile. Among other things, lauryl peroxide is particularly suitable.

The content of the polymerization catalyst added may suitably be 0.01-5% by mass, more suitably 0.05-3% by mass, and even more suitably 0.1-3% by mass, relative to the total mass of the monomers. If its content were less than 0.01% by mass, the polymerization reaction could not be completed. If its content were greater than 5% by mass, the binding performance of the copolymer of the vinyl alcohol and the alkali metal-neutralized product of ethylene-unsaturated carboxylic acid to be obtained finally could decrease.

An appropriate substance may be selected as the dispersant for use during the polymerization, in accordance with the types and amounts of the monomers used and any other parameters. Specific examples of the dispersant include water-soluble polymers such as polyvinyl alcohol (partially saponified polyvinyl alcohol, fully saponified polyvinyl alcohol), poly(meth)acrylic acid and its salts, polyvinyl pyrrolidone, methylcellulose, carboxymethyl cellulose, hydroxyethyl cellulose, and hydroxypropyl cellulose, and water-insoluble inorganic compounds such as calcium phosphate and magnesium silicate. Any of these dispersant materials may be used alone or two or more of them may be used in combination.

The content of the dispersant used is suitably 0.01-10% by mass, more suitably 0.05-5% by mass, relative to the total mass of the monomers used, although its content varies depending on the types of the monomers used and any other factors.

Moreover, to adjust the surface-active performance and other beneficial functions of the dispersant, a water-soluble salt such as an alkali metal or an alkaline earth metal may be added. Examples of the water-soluble salt include sodium chloride, potassium chloride, calcium chloride, lithium chloride, anhydrous sodium sulfate, potassium sulfate, disodium hydrogen phosphate, dipotassium hydrogen phosphate, trisodium phosphate, and tripotassium phosphate. Any of these water-soluble salts may be used alone, or two or more of them may be used in combination.

The content of the water-soluble salt used is usually 0.01-10% by mass relative to the mass of an aqueous solution of the dispersant, although the content varies depending on the type and amount of the dispersant used and any other factors.

The temperature at which the monomers are polymerized is suitably −20° C. to +20° C., more suitably −10° C. to +10° C., relative to the ten-hour half-life temperature of the polymerization catalyst.

If the temperature were lower than −20° C. relative to the ten-hour half-life temperature, the polymerization reaction could not be completed. If the temperature were higher than +20° C., the binding performance of the copolymer of the vinyl alcohol and the alkali metal-neutralized product of ethylene-unsaturated carboxylic acid thus obtained could decrease in some cases.

The period of time for which the monomers are polymerized is usually several hours to several tens of hours, although the period varies depending on the type, amount, and polymerization temperature of the polymerization catalyst used and other factors.

After the polymerization reaction has been completed, the copolymer is separated by a process such as centrifugation or filtration, and is obtained in a wet cake form. The copolymer obtained in the wet cake form may be subjected to saponification either as it is or after having been dried if necessary.

The number average molecular weight of the copolymer may be determined by a molecular weight measuring device using a polar solvent, such as DMF, as a solvent, a gel filtration chromatography (GFC) column (OH pak manufactured by Shodex), and any other suitable components.

The number average molecular weight of the copolymer before saponification is suitably 10,000-10,000,000, more suitably 50,000-5,000,000. With the number average molecular weight before saponification set within the range of 10,000-10,000,000, the binding capacity as the binder may improve. This facilitates applying a thick coating of slurry even if the electrode mixture is water-based slurry.

Saponification may be performed in a mixed solvent of an aqueous organic solvent and water in the presence of an alkali including an alkali metal. A conventionally known alkali may be used as an alkali including an alkali metal for the saponification. Alkali metal hydroxides are suitably used. Among other things, sodium hydroxide and potassium hydroxide are particularly suitable because of their high reactivity.

The content of the alkali is suitably 60-140 mol %, more suitably 80-120 mol %, relative to the number of moles of the monomers. If the alkali content were less than 60 mol %, saponification could be insufficient. Use of alkali in an amount greater than 140 mol % would not be economical because the effects achieved would not be enhanced anymore.

Examples of the aqueous organic solvent in the mixed solvent of the aqueous organic solvent and water for use in the saponification may include lower alcohols such as methanol, ethanol, n-propanol, isopropanol, n-butanol, and t-butanol, ketones such as acetone and methyl ethyl ketone, and mixtures of these substances. Among these aqueous organic solvents, lower alcohols are particularly suitable. In particular, methanol or ethanol is suitably used, because use of methanol or ethanol provides a copolymer of vinyl alcohol and an alkali metal-neutralized product of ethylene-unsaturated carboxylic acid with excellent binding performance and excellent resistance to mechanical shear.

The mass ratio of the aqueous organic solvent to water in the mixed solvent of the aqueous organic solvent and water is suitably 2/8-10/0, more suitably 3/7-8/2. If the mass ratio were outside the range of 2/8-10/0, the copolymer before or after saponification could have insufficient compatibility with the solvent, which could possibly prevent sufficient progress of the saponification. If the ratio of the aqueous organic solvent were less than 2/8, the binding capacity of the binder would decrease, and in addition, it would be difficult to industrially obtain a saponified product of a vinyl ester/ethylene-unsaturated carboxylic acid ester copolymer because the viscosity would significantly increase during the saponification.

The temperature at which the vinyl ester/ethylene-unsaturated carboxylic acid ester copolymer is saponified is suitably 20-80° C., more suitably 20-60° C., although the temperature varies depending on the molar ratio of the monomers. If the copolymer were saponified at a temperature of lower than 20° C., the saponification could not be completed. However, if the copolymer were saponified at a temperature of higher than 80° C., a side reaction could possibly occur, such as a decrease in molecular weight caused by an alkali.

The saponification time varies according to the type and amount of the alkali used and other factors. Usually, however, the saponification is completed in about a few to several hours.

Upon completion of the saponification, a dispersing element of a saponified copolymer is usually obtained in the form of paste or slurry. After the dispersing element has been subjected to solid-liquid separation by a conventionally known process such as centrifugation or filtration, the obtained product is well cleaned with a lower alcohol such as methanol. Then, the resultant liquid-containing saponified product of the copolymer is dried. As a result, a saponified product of the copolymer, i.e., a copolymer of the vinyl alcohol and the alkali metal-neutralized product of ethylene-unsaturated carboxylic acid, may be obtained in the form of spherical single particles or agglomerated particles formed by agglomeration of spherical particles.

After the saponification, the saponified product of the copolymer is acidized using an inorganic acid such as hydrochloric acid, sulfuric acid, phosphoric acid, or nitric acid, or an organic acid such as formic acid, acetic acid, oxalic acid, or citric acid. Thereafter, with use of an arbitrary alkali metal such as lithium hydroxide, sodium hydroxide, potassium hydroxide, rubidium hydroxide, cesium hydroxide, or francium hydroxide, different types of copolymers of vinyl alcohol and the alkali metal-neutralized product of ethylene-unsaturated carboxylic acid may also be obtained.

The conditions on which the liquid-containing saponified product of the copolymer is dried are not specifically limited. However, in general, the liquid-containing saponified product of the copolymer is suitably dried under normal pressure or reduced pressure at a temperature of 30-120° C.

The drying time is usually a few hours to several tens of hours, although it varies depending on the pressure and temperature during drying.

The volume average particle size of the copolymer of the vinyl alcohol and the alkali metal-neutralized product of ethylene-unsaturated carboxylic acid is suitably 1-200 μm and more suitably 10-100 μm. If the volume average particle size were less than 1 μm, the binding performance could deteriorate. If the volume average particle size were greater than 200 μm, the binding performance could diminish, because the aqueous solution would not be thickened uniformly. The volume average particle size of the copolymer was measured using a laser diffraction particle size analyzer (SALD-7100 manufactured by Shimadzu Corporation) attached with a batch cell (SALD-BC also manufactured by Shimadzu Corporation), and also using 2-propanol or methanol as a dispersion solvent.

If the volume average particle size of the resultant saponified product of the copolymer is greater than 200 μm when the liquid-containing saponified product of the copolymer is dried, then the volume average particle size may be adjusted to 1-200 μm by pulverizing the resultant saponified product of the copolymer by a conventionally known pulverization process such as mechanical milling.

Mechanical milling is a process in which an external force, such as shock, tension, friction, compression, or shear, is applied to the resultant saponified product of the copolymer. Examples of devices used in this process include tumbling mills, vibration mills, planetary mills, rocking mills, horizontal mills, attritor mills, jet mills, grinding machines, homogenizers, fluidizers, paint shakers, and mixers. For example, the planetary mills pulverize or mix a saponified product of copolymer powder by mechanical energy generated by rotating and revolving a container containing the saponified product of the copolymer and a ball. It has been known that this process allows the powder to be pulverized to the nano-order.

The copolymer of the vinyl alcohol and the alkali metal-neutralized product of ethylene-unsaturated carboxylic acid serving as a binder has a thickening effect. Specifically, an aqueous solution containing 1% by mass of the copolymer of the vinyl alcohol and the alkali metal-neutralized product of ethylene-unsaturated carboxylic acid suitably has a viscosity of 50 mPa·s-10000 mPa·s, more suitably 50-5000 mPa·s. If the viscosity were less than 50 mPa·s, the viscosity of the electrode mixture thus obtained in the slurry form would be lower. As a result, the mixture could spread too fast to be applied easily onto the current collector, or the active material and/or conductive assistant in the mixture could be dispersed insufficiently. If the viscosity were greater than 10000 mPa·s, however, the electrode mixture would have too high viscosity, which could make it difficult to apply the mixture uniformly and thinly onto the current collector. In the examples to be described later, the viscosity is set in the range of 300 mPa·s to 3100 mPa·s.

Note that the viscosity of the aqueous solution containing 1% by mass of the copolymer may be measured with a BROOKFIELD rotational viscometer (model number: DV-I+), spindle No. 5, at a rate of 50 rpm (liquid temperature: 25° C.).

The copolymer of the vinyl alcohol and the alkali metal-neutralized product of ethylene-unsaturated carboxylic acid is able to function as a binder for an electric double-layer capacitor electrode with high binding capacity and binding persistence. A possible reason for this may be that the copolymer of the vinyl alcohol and the alkali metal-neutralized product of ethylene-unsaturated carboxylic acid allows a current collector and an active material to bind tightly to each other and also allows particles of the active material to bind tightly to each other to exhibit binding persistence high enough to reduce the chances of the separation of the electrode mixture from the current collector or the elimination of the active material, both arising from a change in the volume of the active material due to repeated charging and discharging, thereby substantially preventing the capacity of the active material from decreasing.

The binder for the electric double-layer capacitor electrode of this embodiment may further include any other water-based binder as well as the copolymer of the vinyl alcohol and the alkali metal-neutralized product of ethylene-unsaturated carboxylic acid. In this case, the amount of the additional water-based binder is suitably less than 80% by mass relative to the total mass of the copolymer of the vinyl alcohol and the alkali metal-neutralized product of ethylene-unsaturated carboxylic acid and the additional water-based binder. In other words, the content of the copolymer of the vinyl alcohol and the alkali metal-neutralized product of ethylene-unsaturated carboxylic acid in the binder is suitably greater than or equal to 20% by mass and less than or equal to 100% by mass.

Examples of materials for the additional water-based binder include carboxymethyl cellulose (CMC), acrylic resins such as polyacrylic acid, sodium polyacrylate, and polyacrylates, sodium alginate, polyimide (PI), polytetrafluoroethylene (PTFE), polyamide, polyamideimide, styrene-butadiene-rubber (SBR), polyvinyl alcohol (PVA), and ethylene-vinyl acetate (EVA) copolymers. Any of these materials may be used alone or two or more of them may be used in combination.

Among the materials for the additional water-based binder, an acrylic resin typified by sodium polyacrylate, sodium alginate, or polyimide are suitably used. Of these materials, an acrylic resin is particularly suitably used.

(Active Material)

Examples of the active materials are not particularly limited as long as they are generally used in electric double-layer capacitors. For example, materials, to/from which a large amount of lithium ions are insertable and extractable, may be used, such as carbon compounds including activated carbon, graphite, hard carbon, and soft carbon, lithium titanate, silicon compounds, and tin compounds. Advantages of this embodiment are obtainable as long as any of such a material is used alone or in the form of an alloy, a compound, a solid solution. Among them, it is recommended to use activated carbon or graphite because they are usable at a low cost.

(Conductive Assistant)

A conductive assistant is not specifically limited as long as it is electrically conductive. Examples of the conductive assistant include powders of a metal, carbon, a conductive polymer, and conductive glass. Among these materials, a spherical, fibrous, needle-like, or massive carbon powder, or a carbon powder in any other form is suitable because of its electronic conductivity and its stability with lithium. Examples of the spherical carbon powders include acetylene black (AB), Ketjen black (KB), graphite, thermal black, furnace black, lamp black, channel black, roller black, disk black, soft carbon, hard carbon, graphene, and amorphous carbon. Examples of the fibrous carbon powders include carbon nanotubes (CNTs), and carbon nanofibers (e.g., vapor grown carbon fibers called VGCFs®). Any of these materials may be used alone or two or more of them may be used in combination.

Among these carbon powders, the fibrous carbon nanofibers or carbon nanotubes are suitably used, and the vapor grown carbon fibers that are carbon nanofibers are more suitably used. The reason for this is that a single carbon powder particle can structurally come into contact with two or more active material particles to form a more efficient conductive network in the electrode, and thus contribute to improving the output characteristics.

(Electrode Mixture)

A conductive assistant, a binder, and water are added to an active material to form slurry in the paste form, thereby obtaining an electrode mixture. The binder may be previously dissolved in water, or the active material and a powder of the binder may be mixed in advance, and then, water may be added to the mixed powder to form a mixture thereof.

The amount of the water for use in the electrode mixture is not specifically limited. However, it is suitably about 40-900% by mass, for example, relative to the total mass of the active material, the conductive assistant, and the binder. If the amount of the water added were less than 40% by mass, the slurry thus obtained could have too high viscosity to allow each of the active material, the conductive assistant, and the binder to be dispersed uniformly, which is not beneficial. If the amount of the water added were greater than 900% by mass, however, the proportion of the water would be too high for the conductive assistant to be easily dispersed uniformly, and to avoid the risk of causing agglomeration of the active material, because when a carbon-based conductive assistant is used, the carbon would repel the water.

The amount of the conductive assistant used is not specifically limited. However, it is suitably about 0.1-30% by mass, more suitably about 0.5-10% by mass, and even more suitably 2-5% by mass, for example, relative to the total mass of the active material, the conductive assistant, and the binder. The amount of the conductive assistant of less than 0.1% by mass is not suitable because the conductivity of the electrode could not be improved sufficiently. It is not recommended for the following reasons that the amount of the conductive assistant used be greater than 20% by mass. First of all, it would be difficult to achieve a high capacity during charging/discharging of the cell because the proportion of the active material would relatively decrease. Secondly, agglomeration of the active material would be incurred because carbon that repels water would make it difficult for the active material to be dispersed uniformly. Moreover, the amount of the binder used would increase because the conductive assistant is smaller in size, and thus has a larger surface area, than the active material.

If carbon nanofibers or carbon nanotubes, which are fibrous carbon, are used as the conductive assistant, the amount of the carbon nanofibers or nanotubes used is not specifically limited. For example, it is suitably 30-100% by mass, more suitably 40-100% by mass, for example, relative to the entire conductive assistant. It is not recommended that the amount of the carbon nanofibers or nanotubes used be less than 30% by mass. The reasons are that in that case, a sufficient conductive path would not be ensured between the electrode active material and the current collector, and in particular, a sufficient conductive path would not be formed during high-speed charging/discharging.

The amount of the binder used is not specifically limited, either. However, it is suitably 0.5% by mass to 30% by mass, more suitably 2% by mass to 20% by mass, and even more suitably 3% by mass to 12% by mass, relative to the total mass of the negative active material, the conductive assistant, and the binder. If the amount of the binder were excessively large, it would be difficult to achieve a high capacity during charging/discharging of the cell because the proportion of the active material would relatively decrease. If the amount of the binder were excessively small to the contrary, the binding capacity would be too insufficient to avoid shortening the cycle lifetime.

If the active material is a powder coated with carbon, or if a carbon-based conductive assistant is used, the carbon that repels water may make it difficult for the active material to be dispersed uniformly while a water-based slurry mixture is being prepared, and also tends to increase the risk of causing agglomeration of the active material. This problem may be solved by adding a surfactant to the slurry.

Examples of the surfactant effective in that case include saponin, phospholipid, peptide, octylglucoside, sodium dodecyl sulfate, polyoxyethylene sorbitan monolaurate, polyoxyethylene sorbitan monooleate, ethyl ether, polysorbate, deoxycholate, and triton. The surfactant may be added to a proportion of about 0.01-0.1% by mass relative to the entire amount of the mixture.

(Electrode)

An electrode may be fabricated with a technique for use in this technical field.

A current collector of the electrode is not specifically limited as long as it is made of a material having electrical conductivity and allowing an electric current to pass through the electrode material retained. Examples of the current collector material include conductive substances such as C, Cu, Ni, Fe, V, Nb, Ti, Cr, Mo, Ru, Rh, Ta, W, Os, Ir, Pt, Au, and Al, and alloys each including two or more of these conductive substances (e.g., stainless steel). Alternatively, iron (Fe) plated with copper (Cu) may also be used. As the current collector, C, Ni, stainless steel, or any other appropriate material is suitably used because of its high electrical conductivity and its high degree of stability and oxidation resistance in an electrolyte. Cu, Ni, or Al is more suitably used because of its material cost.

The shape of the current collector is not specifically limited. However, a foil-like substrate or a three-dimensional substrate may be used. Using, in particular, a three-dimensional substrate (a metal foam, a mesh, a woven fabric, a nonwoven fabric, an expanded substrate, or any other suitable material) provides an electrode having a high capacity density even if the binder lacks adhesion to the current collector. In addition, favorable high-rate charge/discharge characteristics are also achieved.

An electrode may be fabricated by applying an electrode mixture dispersed in water onto a current collector using a coating machine such as a bar coater. The electrode thus obtained is dried such that the electrode mixture coating adheres to the current collector. Thus, an electrode may be completed.

If the drying of the electrode is not enough, the performance of the electrode as a capacitor may deteriorate due to a trace amount of remaining water. Thus, in order to dry the electrode sufficiently, the electrode is suitably dried at a temperature falling within the range of 120-450° C., more suitably 120-400° C., even more suitably 160-300° C. Further, the electrode is suitably dried at such temperature within a non-oxidizing atmosphere, such as a nitrogen, argon, or helium atmosphere. Although the cause is not clear, it is presumed that the drying at such a high temperature as described above causes carbonization due to partial dehydration on a binder surface or any other sites to such a degree that the binding capacity of the binder in the electrode does not decrease significantly due to complete carbonization or degeneration. Thus, it is assumed that the effect of assisting the conductivity of the electrode is obtained while maintaining sufficient binding strength.

<Electric Double-Layer Capacitor>

The electric double-layer capacitor electrode of this embodiment may be used to prepare an electric double-layer capacitor according to this embodiment. Further, the electrolyte of the electric double-layer capacitor of this embodiment may be a solid electrolyte or an ionic liquid.

The electric double-layer capacitor configured as described above may function as an electric double-layer capacitor having a significantly longer lifetime.

The configuration of the electric double-layer capacitor is not specifically limited. However, this configuration is applicable to the forms and configurations of existing capacitors, such as layered capacitors or wound capacitors.

<Electric Device>

An electric double-layer capacitor including the electrode of this embodiment has a significantly longer lifetime, and is usable as a power source for various electric devices (including electrically powered vehicles).

Specific examples of the electric devices include air-conditioners, washing machines, TV sets, refrigerators, cooling devices, laptop computers, tablets, smartphones, PC monitors, desktop PCs, CRT monitors, printers, all-in-one PCs, PC peripheral devices, clothes dryers, transceivers, blowers, music recorders, music players, ovens, microwave ovens, toilet seats with a cleaning function, fan heaters, car stereos, car navigators, dehydrators, air cleaners, mobile phones, emergency lamps, game machines, disc changers, radios, lighting equipment, dehumidifiers, electric rice cookers, stereos, electric radiant heaters, trouser presses, cleaners, movie players, electric carpets, desk lamps, calculators, electric carts, electric wheelchairs, electric tools, electric toothbrushes, phones, air circulators, electric bug killers, copy machines, hot plates, toasters, dryers, panel heaters, pulverizers, camcorders, videocassette recorders, fax machines, rice cake makers, floor heating panels, lanterns, remote controllers, word processors, electronic musical instruments, motorcycles, lawn mowers, electric bicycles, motor vehicles, hybrid vehicles, plug-in hybrid vehicles, electric vehicles, electric forklifts, railroads, ships, airplanes, and emergency storage batteries.

EXAMPLES

The present invention will now be described in more detail with reference to illustrative examples. Note that the present invention is in no way limited to these examples.

<Preparation of Copolymer>

First Preparation Example

Synthesis of Vinyl Ester/Ethylene-Unsaturated Carboxylic Acid Ester Copolymer

First, 768 g of water and 12 g of sodium sulfate anhydrate were loaded into a reaction vessel having a capacity of 2 L and including an agitator, a thermometer, an $N_2$ gas introduction pipe, a reflux condenser, and a dropping funnel, and $N_2$ gas was blown into the vessel to deoxidize this system. Subsequently, 1 g of partially saponified polyvinyl alcohol (the degree of saponification: 88%) and 1 g of lauryl peroxide were loaded into the reaction vessel, and the inside temperature was increased to 60° C. Then, monomers of 104 g of methyl acrylate (1.209 mol) and 155 g of vinyl acetate (1.802 mol) were dropped through the dropping funnel for four hours, and then, this reaction vessel was maintained at an inside temperature of 65° C. for two hours, thereby completing the polymerization reaction. Thereafter, a solid content was filtered out to obtain 288 g of a vinyl acetate/methyl acrylate copolymer (having a water content of 10.4%). The polymer thus obtained was dissolved in dimethylformamide (DMF), and then filtration was performed. The number average molecular weight of the resultant material determined by a molecular weight detector (2695 and an RI detector 2414, manufactured by Waters Corporation) was 188,000.

Second Preparation Example

Synthesis of Copolymer of Vinyl Alcohol and Alkali Metal-Neutralized Product of Ethylene-Unsaturated Carboxylic Acid First, 450 g of methanol, 420 g of water, 132 g (3.3 mol) of sodium hydroxide, and 288 g of the water-containing copolymer (having a water content of 10.4%) thus obtained were loaded into a reaction vessel similar to that described above, and saponification was performed at 30° C. for three hours under stirring. After completion of the saponification, the saponified product of the copolymer thus obtained was cleaned with methanol, filtered, and then dried at 70° C. for six hours, thereby obtaining 193 g of a saponified product of vinyl acetate/methyl acrylate copolymer (a copolymer of vinyl alcohol and sodium acrylate). The volume average particle size of the saponified product of the vinyl acetate/methyl acrylate copolymer (a copolymer of vinyl alcohol and sodium acrylate) was 180 μm.

Third Preparation Example

Pulverization of Copolymer of Vinyl Alcohol and Sodium Acrylate

First, 193 g of the copolymer of vinyl alcohol and sodium acrylate was pulverized with a jet mill (LJ manufactured by Nippon Pneumatic Mfg. Co., Ltd.) to obtain 173 g of the copolymer of vinyl alcohol and sodium acrylate in an impalpable powder form. The particle size of the copolymer of vinyl alcohol and sodium acrylate thus obtained was measured with a laser diffraction particle size analyzer (SALD-7100 manufactured by Shimadzu Corporation). As a result, the volume average particle size was 46 μm. The copolymer of vinyl alcohol and sodium acrylate obtained in the third preparation example will be hereinafter referred to as Copolymer 1.

Fourth Preparation Example

A copolymer of vinyl acetate/methyl acrylate was obtained in the same manner as in the first preparation example except that 104 g (1.209 mol) of a monomer of methyl acrylate and 155 g (1.802 mol) of a monomer of vinyl acetate used in the first preparation example were replaced with 155 g (1.802 mol) of a monomer of methyl acrylate and 104 g (1.209 mol) of a monomer of vinyl acetate. The copolymer thus obtained was saponified in the same manner as in the second preparation example to obtain a copolymer of vinyl alcohol and sodium acrylate. The saponified product of the copolymer thus obtained was pulverized in the same manner as in the third preparation example to obtain Copolymer 2 having a particle size of 38 μm.

Fifth Preparation Example

A copolymer of vinyl acetate/methyl acrylate was obtained in the same manner as in the first preparation example except that 104 g (1.209 mol) of a monomer of methyl acrylate and 155 g (1.802 mol) of a monomer of vinyl acetate used in the first preparation example were replaced with 51.8 g (0.602 mol) of a monomer of methyl acrylate and 207.2 g (2.409 mol) of a monomer of vinyl acetate. The copolymer thus obtained was saponified in the same manner as the second preparation example to obtain a copolymer of vinyl alcohol and sodium acrylate. The saponified product of the copolymer thus obtained was pulverized in the same manner as in the third preparation example to obtain Copolymer 3 having a particle size of 39 μm.

Table 1 summarizes data about Copolymers 1-3 obtained in the preparation examples, namely, the viscosities of aqueous solutions respectively containing 1% by mass of Copolymers 1-3, volume average particle sizes, and the copolymer composition ratios of vinyl alcohol to sodium acrylate. The ratio of saponification was 99% or higher in every copolymer. Note that the viscosity of the aqueous solution containing 1% by mass of the copolymer was measured with a BROOKFIELD rotational viscometer (model number: DV-I+), Spindle No. 5, at a rate of 50 rpm (liquid temperature: 25° C.).

TABLE 1

| Preparation example | Copolymer | Viscosity of aqueous solution containing 1% by mass of copolymer (mPa · s) | Volume average particle size (μm) | Composition of copolymer (mol %) | |
|---|---|---|---|---|---|
| | | | | Vinyl alcohol | Sodium acrylate |
| 3 | 1 | 1600 | 46 | 60 | 40 |
| 4 | 2 | 2700 | 38 | 40 | 60 |
| 5 | 3 | 150 | 39 | 80 | 20 |

<Fabrication of Electrode>

Example 1

First, 85 parts by mass of activated carbon (Shirasagi KA manufactured by Japan EnviroChemicals, Ltd.), 5 parts by mass of the copolymer of vinyl alcohol and sodium acrylate obtained in the third preparation example serving as a binder (Copolymer 1 shown in Table 1), 10 parts by mass of Ketjen black (ECP-300JD manufactured by Lion) as a conductive assistant, and 150 parts by mass of water as a dispersant were mixed to prepare an electrode mixture in a slurry form.

The mixture was applied onto aluminum foil with a thickness of 20 μm, and was dried. Then, the aluminum foil and the coating were tightly bonded together by a roll press (manufactured by Oono-Roll Corporation). Next, heating (under a reduced pressure at 160° C. for 3 or more hours) was performed to fabricate a test electrode.

The electrode had an electrode density of 0.6 g/cc.

Example 2

An electrode was fabricated and evaluated in the same manner as in Example 1 except that Copolymer 1 used in Example 1 was replaced with Copolymer 2 prepared in the fourth preparation example Example 3

An electrode was fabricated and evaluated in the same manner as in Example 1 except that Copolymer 1 used in Example 1 was replaced with Copolymer 3 prepared in the fifth preparation example Example 4

An electrode was fabricated and evaluated in the same manner as in Example 1 except that 10 parts by mass of Ketjen black used as the conductive assistant in Example 1 was replaced with 5 parts by mass of Ketjen black and 5 parts by mass of vapor grown carbon fibers.

Comparative Example 1

An electrode was fabricated and evaluated in the same manner as in Example 1 except that Copolymer 1 used in Example 1 was replaced with PVdF (KF polymer #1120 manufactured by KUREHA CORPORATION) and water used as the dispersant was replaced with N-methyl pyrrolidone.

Comparative Example 2

An electrode was fabricated and evaluated in the same manner as in Example 1 except that 5 parts by mass of Copolymer 1 used in Example 1 was replaced with 2.5 parts by mass of SBR latex (TRD2001 manufactured by JSR) and 2.5 parts by mass of CMC (#2260 manufactured by Daicel FineChem Ltd.).

TABLE 2

| | Active material A | Binder B | Binder C | Conductive assistant D | Conductive assistant E | Positive electrode composition ratio (% by mass) A:B:C:D:E |
|---|---|---|---|---|---|---|
| Ex. 1 | Activated carbon | Copolymer 1 | — | KB | — | 85:5:0:10:0 |
| Ex. 2 | Activated carbon | Copolymer 2 | — | KB | — | 85:5:0:10:0 |
| Ex. 3 | Activated carbon | Copolymer 3 | — | KB | — | 85:5:0:10:0 |
| Ex. 4 | Activated carbon | Copolymer 1 | — | KB | Vapor grown carbon fibers | 85:5:0:5:5 |
| Com. Ex. 1 | Activated carbon | PVdF | — | KB | — | 85:5:0:10:0 |
| Com. Ex. 2 | Activated carbon | SBR | CMC | KB | — | 85:2.5:2.5:10:0 |

<Assembly of Electric Double-Layer Capacitor>

Two test electrodes (of each of Examples 1-4 and Comparative Examples 1-2) thus obtained were arranged to face each other with a cellulose separator interposed therebetween to fabricate an electric double-layer capacitor element (electrode area: 1 cm$^2$). In a dry room at a dew point temperature of −50° C. or lower, the test electrodes were immersed in a solution of 1M tetraethyl ammonium tetrafluoroborate/propylene carbonate under reduced pressure to fabricate a coin-shaped electric double-layer capacitor cell.

<Evaluation of Capacitance and Internal Resistance>

The cell was charged at a constant current of 10 mA to 2.5 V, and then relaxation charge was performed at 2.5 V for 30 minutes. Thereafter, a discharge of the cell was conducted at a constant current of 1 mA to 0 V. A discharge time from 2.5 V to 2 V and a discharge time from 2.5 V to 1 V were regarded as T2 and T1, respectively, and the capacitance [F] was calculated by the following formula.

$$F[F]=(T1-T2)[sec]/1[v]\times 0.001[A] \quad \text{formula}$$

A capacitance per volume was obtained by dividing F by the volume of the electrode (F/cc).

Further, in the same manner as the measurement of the capacitance, relaxation charge was performed at 2.5 V for 30 minutes, and then the internal resistance R was calculated based on a voltage drop ΔV when a constant current discharge was performed at a discharge current of 100 mA.

$$R=\Delta V/0.1 \quad \text{formula}$$

<Adhesive Strength (Peel Strength)>

Each of the electrodes obtained in Examples 1-4 and Comparative Examples 1-2 was cut into a size of 15 mm×100 mm, and an electrode current collector and a measurement base were fixed thereto. Then, an adhesive tape was bonded uniformly to the surface of the electrode active material, and then peeled in a direction of 180° at a rate of 50 mm/min using an EZ-TEST manufactured by Shimadzu Corporation to evaluate its adhesive strength from 50 mm to 100 mm Evaluation criteria were as follows.

○: Electrode was not peeled
Δ: Aluminum foil was partially observed
×: Aluminum foil was clearly observed <Bending Test>

Each of the electrodes obtained in Examples 1-4 and Comparative Examples 1-2 was cut into a size of 15 mm×100 mm. Then, a cylindrical column having a diameter of 5 mm was placed at the middle of the surface of the current collector such that the height direction of the column was parallel to the shorter sides of the electrode. Then, the electrode was bent at both sides of the column to see if the active material mixture peeled or cracked.

TABLE 3

| | Binder | Peel strength | Bending test | Capacitance (F/cc) | Internal resistance (Ω) |
|---|---|---|---|---|---|
| Ex. 1 | Copolymer 1 | ○ | ○ | 19 | 2.2 |
| Ex. 2 | Copolymer 2 | ○ | ○ | 20 | 2.4 |
| Ex. 3 | Copolymer 3 | ○ | ○ | 19 | 2.3 |
| Ex. 4 | Copolymer 1 | ○ | ○ | 19 | 2.2 |
| Com. Ex. 1 | PVdF | × | × | 14 | 3.5 |
| Com. Ex. 2 | SBR/CMC | Δ | × | 16 | 3.7 |

As can be seen from the results shown in Table 3, the binders for an electric double-layer capacitor electrode according to the present invention used in Examples 1-4 exhibited a better adhesive strength than the binders used in Comparative Examples 1 and 2 in terms of peel strength and bending test. Further, the electric double-layer capacitors including the electrodes using these binders tended to have decreased resistance and increased capacitance.

Other Embodiments

Various embodiments described above are merely exemplary ones of the present invention, and are not intended to limit the scope of the present invention. Rather, those embodiments may be combined with, or partially replaced with, common, conventional, or known techniques. The present invention also encompasses numerous other modifications and variations that would readily occur to those skilled in the art.

In the specific examples described above, sodium acrylate is used as an alkali metal-neutralized product of ethylene-unsaturated carboxylic acid in the binder. However, even if a methacrylate is used as the ethylene-unsaturated carboxylic acid, a binder which can provide similar advantages may also be obtained by adjusting the rate of copolymerization and/or the degree of polymerization. Further, the alkali metal may be lithium or potassium as well.

A binder for an electric double-layer capacitor electrode according to the present invention exhibits better binding property than ongoing PVdF or SBR/CMC binders in terms of a peel test and a bending test. An electric double-layer capacitor including the electrode of the present invention is suitably applicable to power sources for mobile communications devices, portable electronic devices, electric bicycles, electric two wheelers, electric vehicles, and various other electric devices.

The invention claimed is:

1. An electric double-layer capacitor comprising:
   an electric double-layer capacitor electrode comprising:
      an active material;
      a conductive assistant; and
      a binder comprising a copolymer of vinyl alcohol and an alkali metal-neutralized product of ethylene-unsaturated carboxylic acid, wherein the copolymer of the vinyl alcohol and the alkali metal-neutralized product of ethylene-unsaturated carboxylic acid has a molar ratio of the vinyl alcohol to the alkali metal-neutralized product of ethylene-unsaturated carboxylic acid of 9/1-1/9; and
   a non-aqueous electrolyte.

2. An electric device comprising the electric double-layer capacitor of claim 1.

3. The electric double-layer capacitor of claim 1, wherein the content of the binder is 0.5% by mass to 30% by mass relative to the total mass of the active material, the conductive assistant, and the binder.

* * * * *